US011713029B2

(12) United States Patent
Ohtaka et al.

(10) Patent No.: US 11,713,029 B2
(45) Date of Patent: Aug. 1, 2023

(54) HYDRAULIC PRESSURE CONTROL UNIT

(71) Applicant: Robert Bosch GmbH, Stuttgart (DE)

(72) Inventors: Jun Ohtaka, Kanagawa (JP); Takuya Okada, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 17/053,907

(22) PCT Filed: Apr. 10, 2019

(86) PCT No.: PCT/IB2019/052938
§ 371 (c)(1),
(2) Date: Nov. 9, 2020

(87) PCT Pub. No.: WO2019/215520
PCT Pub. Date: Nov. 14, 2019

(65) Prior Publication Data
US 2021/0276520 A1 Sep. 9, 2021

(30) Foreign Application Priority Data
May 7, 2018 (JP) .................................. 2018-089362

(51) Int. Cl.
*B60T 8/36* (2006.01)
*B60R 16/023* (2006.01)
(Continued)

(52) U.S. Cl.
CPC ............ *B60T 8/368* (2013.01); *B60R 16/023* (2013.01); *B60T 8/1706* (2013.01); *H04L 12/40* (2013.01); *H04L 2012/40215* (2013.01)

(58) Field of Classification Search
CPC .................. B60R 16/023; H04L 12/40; H04L 2012/40215
See application file for complete search history.

(56) References Cited

U.S. PATENT DOCUMENTS 6,241,489 B1 * 6/2001 Lewin ..................... B60T 8/368
439/744
2007/0018498 A1 * 1/2007 Nakazawa ............ B60T 8/4081
303/119.3
(Continued)

FOREIGN PATENT DOCUMENTS

CN   103883405 A   *   6/2014
CN   205149563 U   *   4/2016
(Continued)

OTHER PUBLICATIONS

International Search Report and Written Opinion for Application No. PCT/IB2019/052938 dated Aug. 13, 2019 (13 pages).

*Primary Examiner* — Vishal R Sahni
(74) *Attorney, Agent, or Firm* — Michael Best & Friedrich LLP

(57) ABSTRACT

The present invention obtains a hydraulic pressure control unit capable of saving a space where a device can be mounted in a straddle-type vehicle.

In the hydraulic pressure control unit according to the present invention, a controller includes a brake control section that controls operation of a component for controlling a brake hydraulic pressure generated in the straddle-type vehicle, and the brake control section is accommodated in a case that is held by a base body. The controller further includes a power control section that controls operation of a power generator for the straddle-type vehicle, and the power control section is accommodated together with the brake control section in the case.

12 Claims, 5 Drawing Sheets

(51) Int. Cl.
*B60T 8/17* (2006.01)
*H04L 12/40* (2006.01)

(56) References Cited

U.S. PATENT DOCUMENTS

| | | | | |
|---|---|---|---|---|
| 2009/0024294 A1* | 1/2009 | Ishida | ......... | B60W 10/184 |
| | | | | 701/87 |
| 2015/0353065 A1* | 12/2015 | Iyatani | ......... | B60T 13/686 |
| | | | | 303/10 |
| 2018/0056966 A1* | 3/2018 | Atsushi | ......... | B60T 8/368 |
| 2018/0170334 A1* | 6/2018 | Loeffler | ......... | B60T 8/404 |
| 2021/0094524 A1* | 4/2021 | Wetzel | ......... | F15B 21/08 |
| 2021/0114573 A1* | 4/2021 | Sagayama | ......... | B60T 13/686 |

FOREIGN PATENT DOCUMENTS

| | | | | |
|---|---|---|---|---|
| DE | 19518522 A1 | 11/1996 | | |
| DE | 19843861 A1 * | 4/2000 | ......... | B60T 8/36 |
| EP | 0180096 A2 | 5/1986 | | |
| EP | 1277635 A2 | 1/2003 | | |
| JP | S6185248 A | 4/1986 | | |
| JP | 2014015077 A | 1/2014 | | |
| JP | 2018008674 A | 1/2018 | | |
| JP | 2018127117 A * | 8/2018 | ......... | B60T 17/22 |
| JP | 2020518513 A * | 6/2020 | | |
| WO | WO-9747502 A1 * | 12/1997 | ......... | B60T 8/368 |

\* cited by examiner

HYDRAULIC PRESSURE CONTROL UNIT

BACKGROUND OF THE INVENTION

The present disclosure relates to a hydraulic pressure control unit capable of saving a space where a device can be mounted in a straddle-type vehicle.

Conventionally, a brake system for a straddle-type vehicle such as a motorcycle includes a hydraulic pressure control unit for controlling a braking force to brake a wheel of the straddle-type vehicle. More specifically, the hydraulic pressure control unit includes a hydraulic pressure control mechanism that includes a base body and components (for example, a control valve and the like) assembled in the base body to control a brake hydraulic pressure generated in the straddle-type vehicle. The hydraulic pressure control unit is also provided with a controller that controls operation of the components in the hydraulic pressure control mechanism, and the controller is accommodated in a case held by the base body (for example, see JP-A-2018-008674).

SUMMARY OF THE INVENTION

By the way, various controllers other than the controller in the hydraulic pressure control unit are mounted on the conventional straddle-type vehicle. An example of the other controller is a controller that controls operation of a power generator (for example, an engine or the like) for the straddle-type vehicle. In a state of being accommodated in a different case from the case that accommodates the controller in the hydraulic pressure control unit, such a controller is mounted at a different position from the hydraulic pressure control unit on the straddle-type vehicle. Just as described, mounting the various controllers at the different positions on the straddle-type vehicle is a cause of expanding a space used to mount the controllers in a space where devices can be mounted in the straddle-type vehicle.

The present invention has been made with the above-described problem as the background and therefore obtains a hydraulic pressure control unit capable of saving a space where a device can be mounted in a straddle-type vehicle.

Solution to Problem

A hydraulic pressure control unit according to the present invention is a hydraulic pressure control unit of a brake system for a straddle-type vehicle, and includes: a hydraulic pressure control mechanism that includes a base body and a component incorporated in the base body to control a brake hydraulic pressure generated in the straddle-type vehicle; a controller that includes a brake control section that controls operation of the component; and a case that is held by the base body in a state of accommodating the brake control section. The controller includes a power control section that controls operation of a power generator for the straddle-type vehicle, and the power control section is accommodated together with the brake control section in the case.

Advantageous Effects of Invention

In the hydraulic pressure control unit according to the present invention, the controller includes the brake control section that controls the operation of the component for controlling the brake hydraulic pressure generated in the straddle-type vehicle, and the brake control section is accommodated in the case that is held by the base body. The controller further includes the power control section that controls the operation of the power generator for the straddle-type vehicle, and the power control section is accommodated together with the brake control section in the case. In this way, it is possible to prevent a controller that controls the operation of the above component and a controller that controls the operation of the power generator from being separately mounted on the straddle-type vehicle. Therefore, a space where the devices can be mounted in the straddle-type vehicle can be saved.

DETAILED DESCRIPTION

Figure 1:
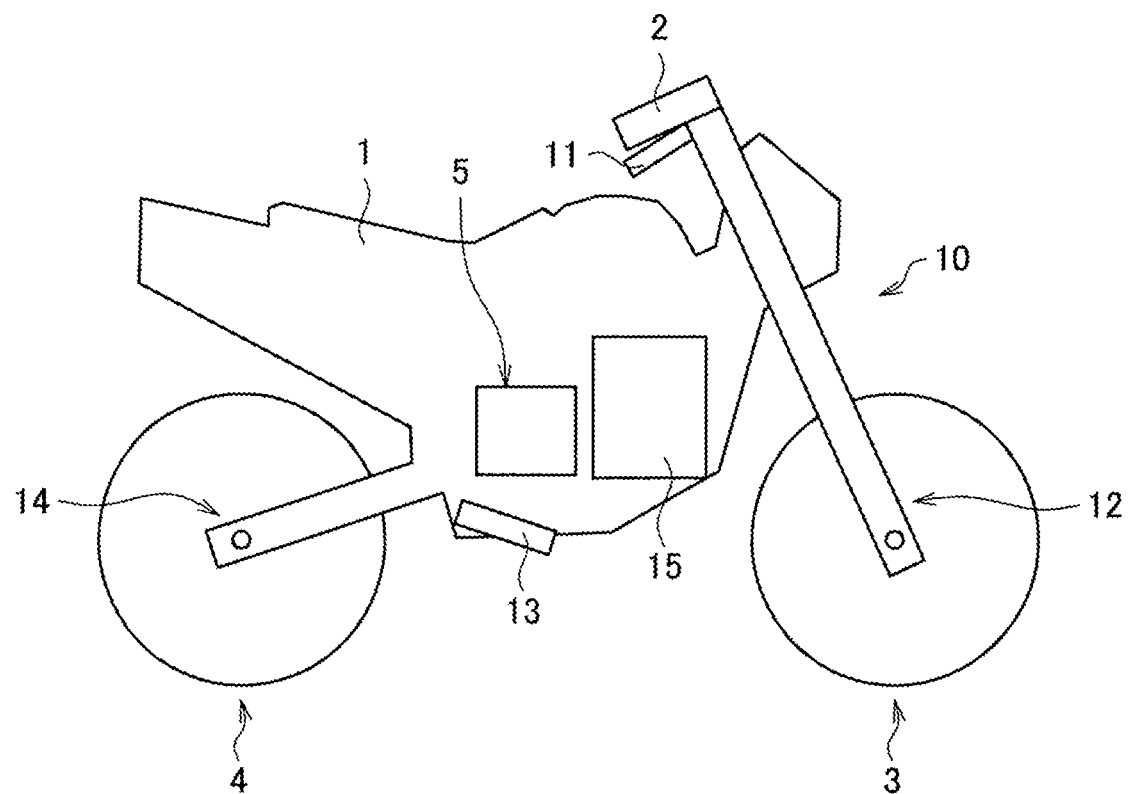
FIG. 1 is a schematic view of an outline structure of a motorcycle on which a brake system according to an embodiment of the present invention is mounted.

A description will hereinafter be made on a hydraulic pressure control unit according to the present invention with reference to the drawings. A description will hereinafter be made on a hydraulic pressure control unit in a brake system for a two-wheeled motorcycle. However, the hydraulic pressure control unit according to the present invention may be applied to a brake system for a straddle-type vehicle other than the two-wheeled motorcycle (for example, an all-terrain vehicle, a three-wheeled motorcycle, or the like). The straddle-type vehicle means a vehicle that a driver straddles. In addition, a description will hereinafter be made on a case where each of a front-wheel brake mechanism and a rear-wheel brake mechanism is provided in one unit; however, at least one of the front-wheel brake mechanism and the rear-wheel brake mechanism may be provided in multiple units. Furthermore, a description will hereinafter be made on a case where a primary channel, a secondary channel, and a supply channel are provided in each of the brake mechanisms; however, the supply channel may not be provided from the channel in each of the brake mechanisms. Moreover, a description will hereinafter be made on a case where an engine is mounted as a power generator on the motorcycle; however, a power generator (for example, a motor) other than the engine may be mounted as the power generator on the motorcycle, or the multiple power generators may be mounted.

A configuration and the like, which will be described below, constitute merely one example, and the hydraulic pressure control unit according to the present invention is not limited to a case with such a configuration and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Hydraulic Pressure Control Unit>

A description will be made on a configuration of a hydraulic pressure control unit 5 according to an embodiment of the present invention.

The hydraulic pressure control unit 5 controls a braking force to brake each wheel of a straddle-type vehicle. In this embodiment, the hydraulic pressure control unit 5 is provided in a brake system 10 for a motorcycle 100 as the straddle-type vehicle.

Figure 2:
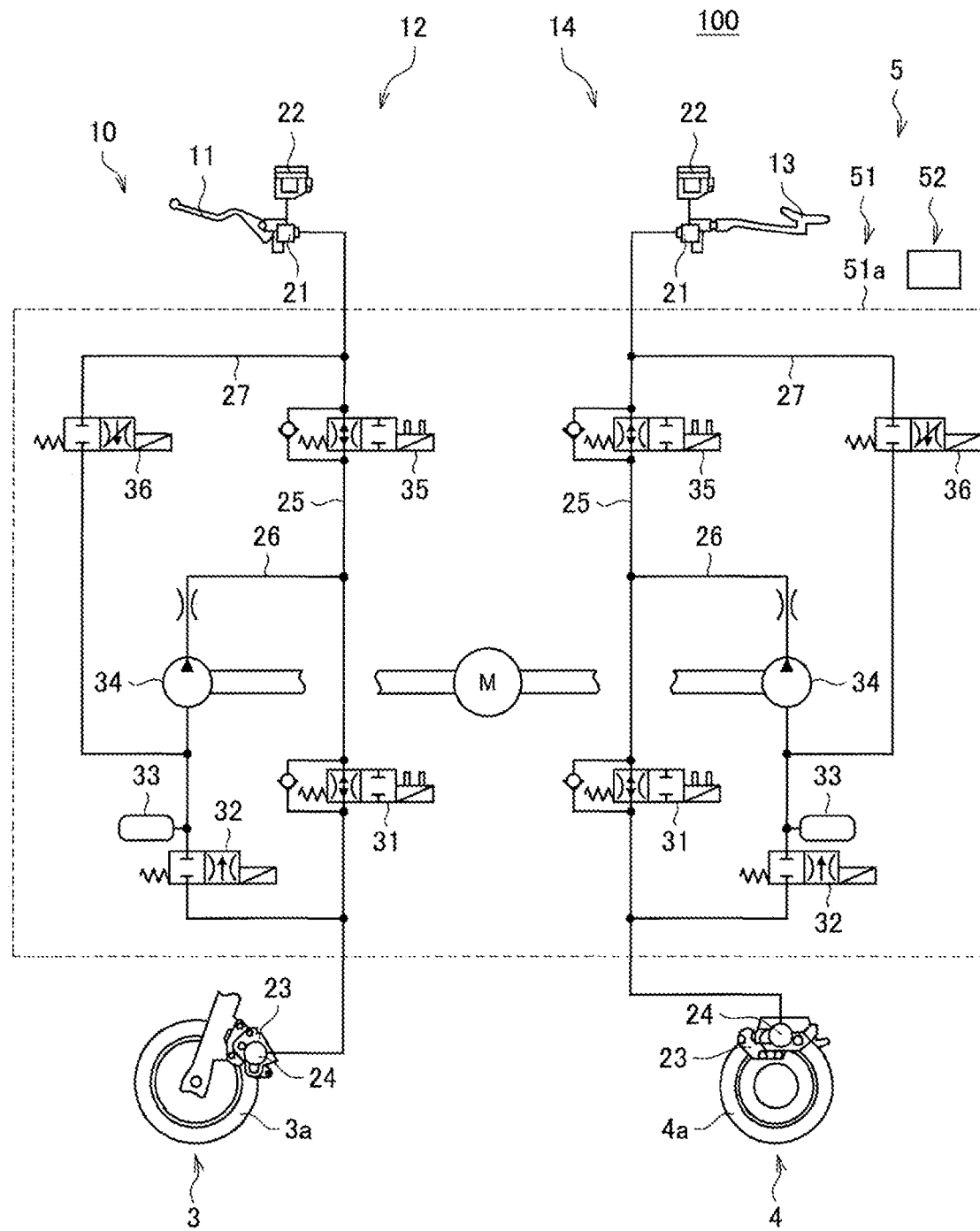
FIG. 2 is a schematic diagram of an outline configuration of the brake system according to the embodiment of the present invention.

A description will be first made on an overall configuration of the brake system 10 according to the embodiment of the present invention with reference to FIG. 1 and FIG. 2.

FIG. 1 is a schematic view of an outline structure of the motorcycle 100 on which the brake system 10 including the hydraulic pressure control unit 5 according to the embodiment of the present invention is mounted. FIG. 2 is a schematic diagram of an outline configuration of the brake system 10 according to the embodiment of the present invention.

As illustrated in FIG. 1 and FIG. 2, the brake system 10 is mounted on the motorcycle 100. The motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; and an engine 15.

The engine 15 corresponds to an example of a power generator for the motorcycle 100, and the motorcycle 100 travels by using power output from the engine 15. For example, the engine 15 is provided with: one or multiple cylinders in each of which a combustion chamber is formed; a fuel injector that injects fuel into the combustion chamber; and an ignition plug. When fuel is injected from the fuel injector, air-fuel mixture containing air and the fuel is produced in the combustion chamber, and the air-fuel mixture is then ignited by the ignition plug and burned. Consequently, a piston provided in the cylinder reciprocates. A throttle valve is provided in an intake pipe of the engine 15, and an intake amount for the combustion chamber varies in accordance with a throttle opening amount as an opening degree of the throttle valve.

The brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in the interlocking manner with at least the second brake operation section 13. The brake system 10 also includes the hydraulic pressure control unit 5, and a part of the front-wheel brake mechanism 12 and a part of the rear-wheel brake mechanism 14 are included in the hydraulic pressure control unit 5. The hydraulic pressure control unit 5 is a unit that has a function of controlling the braking force to be applied to the front wheel 3 by the front-wheel brake mechanism 12 and the braking force to be applied to the rear wheel 4 by the rear-wheel brake mechanism 14.

The first brake operation section 11 is provided on the handlebar 2 and is operated by the driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided in the brake caliper 23; a primary channel 25 through which a brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. Between an end of the primary channel 25 on the master cylinder 21 side and a portion thereof to which a downstream end of the secondary channel 26 is connected, a first valve (USV) 35 is provided. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The inlet valve 31, the outlet valve 32, the accumulator 33, the pump 34, the first valve 35, and the second valve 36 correspond to components, each of which controls a brake hydraulic pressure generated in the motorcycle 100, and are included in the hydraulic pressure control unit 5. Operation of each of these components is controlled by a controller 52 in the hydraulic pressure control unit 5. Accordingly, the braking force to be applied to the front wheel 3 by the front-wheel brake mechanism 12 and the braking force to be applied to the rear wheel 4 by the rear-wheel brake mechanism 14 are controlled. The controller 52 controls the operation of each of the above components in accordance with a travel state of the motorcycle 100, for example.

For example, in a normal state, that is, in a state where ABS operation, automatic braking operation, or the like, which will be described below, is not executed, the controller 52 opens the inlet valve 31, closes the outlet valve 32, opens the first valve 35, and closes the second valve 36. When the first brake operation section 11 is operated in such a state, in the front-wheel brake mechanism 12, the piston (not illustrated) in the master cylinder 21 is pressed to increase the hydraulic pressure of the brake fluid in the wheel cylinder 24, the brake pad (not illustrated) of the brake caliper 23 is then pressed against a rotor 3a of the front wheel 3, and the braking force is thereby applied to the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby applied to the rear wheel 4.

The ABS operation is operation that is executed when the wheel (more specifically, the front wheel 3 or the rear wheel 4) is locked or possibly locked and that reduces the braking force applied to the wheel without relying on an operation of the brake operation section (more specifically, the first brake operation section 11 or the second brake operation section 13) by the driver, for example. For example, in a state where the ABS operation is executed, the controller 52 closes the inlet valve 31, opens the outlet valve 32, opens the first valve 35, and closes the second valve 36. When the pump 34 is driven by the controller 52 in such a state, the hydraulic pressure of the brake fluid in the wheel cylinder 24 is reduced, and the braking force that is applied to the wheel is thereby reduced.

The automatic braking operation is operation that is executed when it becomes necessary to stabilize posture of the motorcycle 100 during turning of the motorcycle 100 or the like and that causes the generation of the braking force to be applied to the wheel (more specifically, the front wheel 3 or the rear wheel 4) without relying on the operation of the brake operation section (more specifically, the first brake operation section 11 or the second brake operation section 13) by the driver, for example. For example, in a state where the automatic braking operation is executed, the controller 52 opens the inlet valve 31, closes the outlet valve 32, closes the first valve 35, and opens the second valve 36. When the pump 34 is driven by the controller 52 in such a state, the hydraulic pressure of the brake fluid in the wheel cylinder 24 is increased, and the braking force that brakes the wheel is thereby generated.

Figure 3:
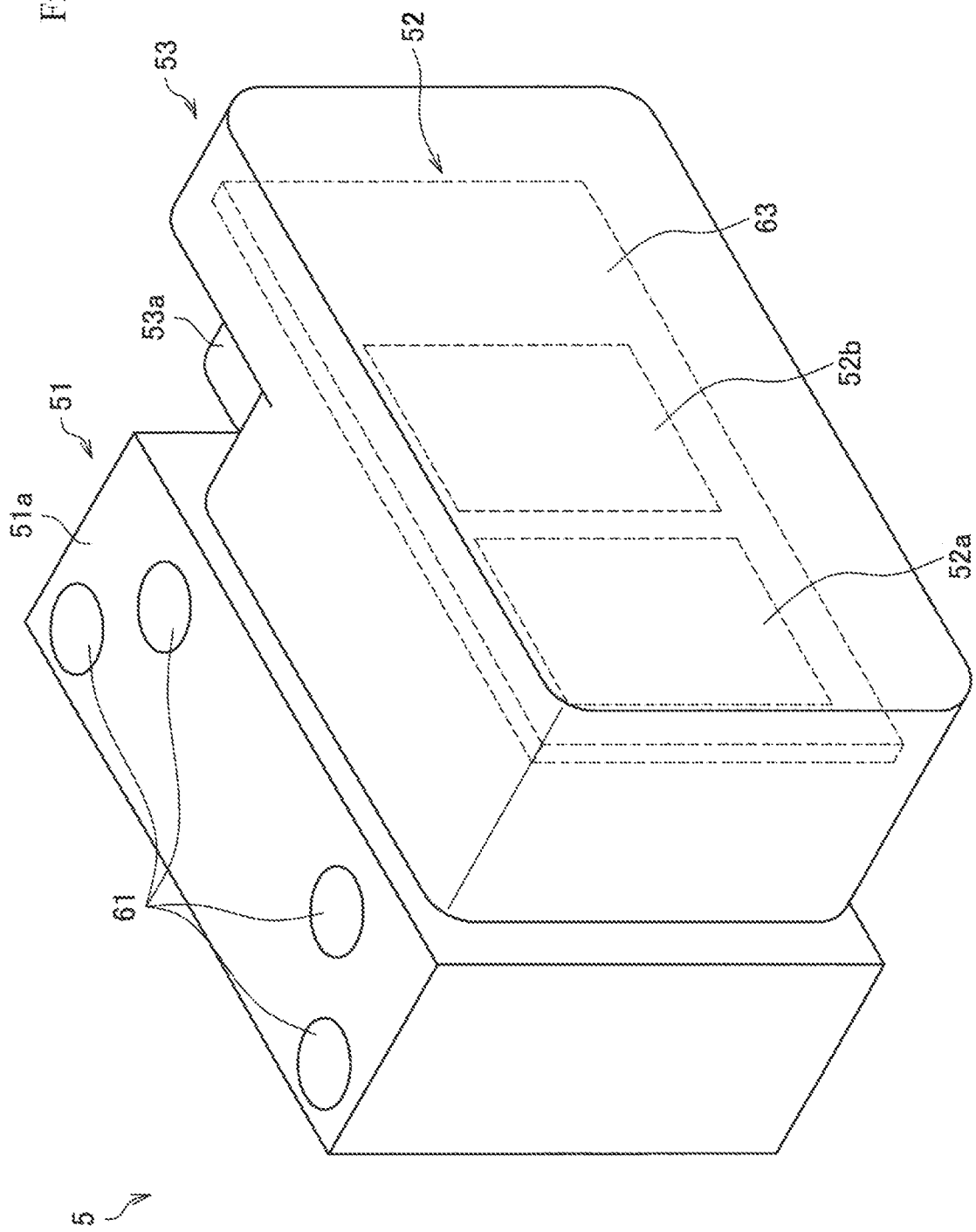
FIG. 3 is a perspective view in which a hydraulic pressure control unit according to the embodiment of the present invention is seen from a case side.
Figure 4:
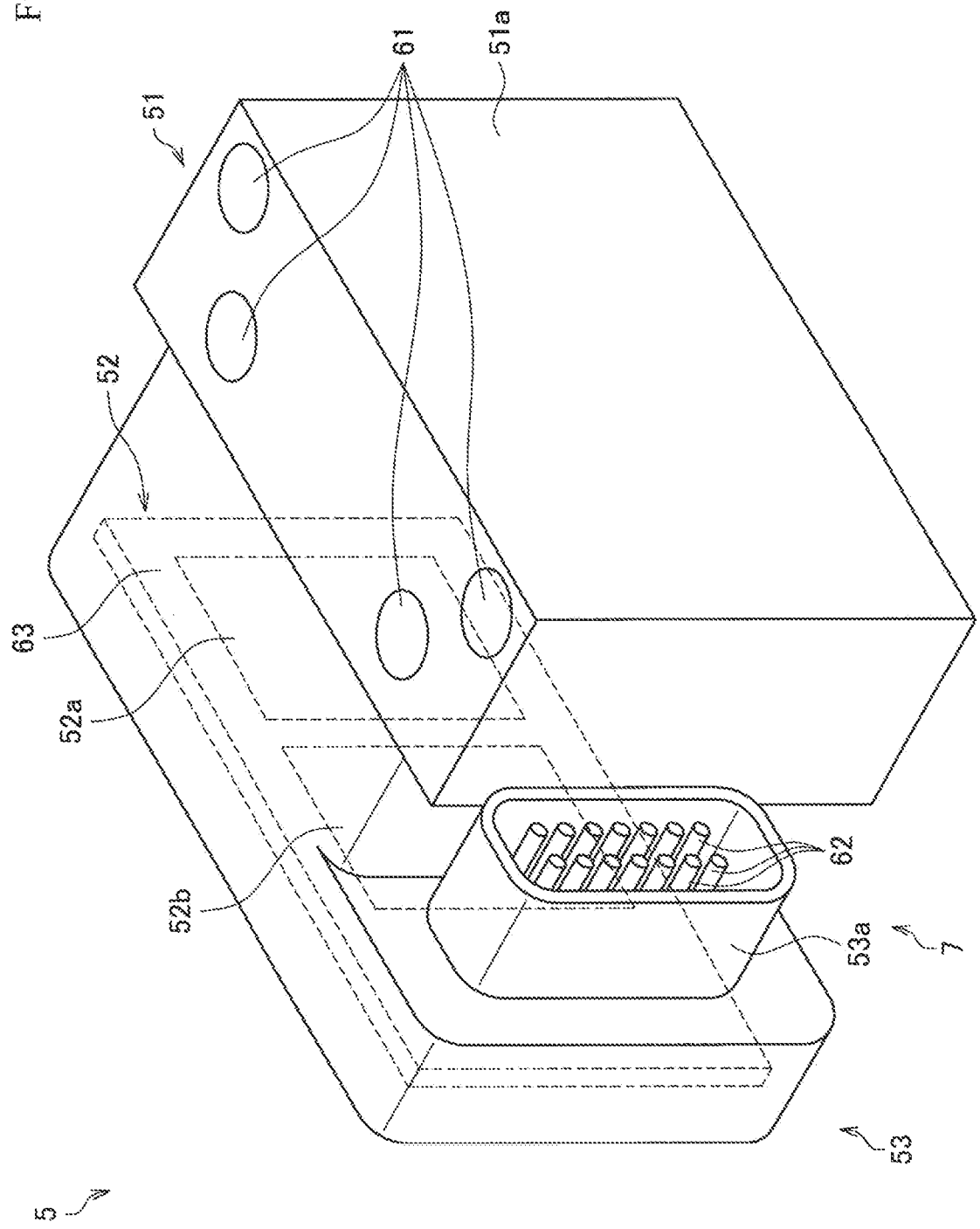
FIG. 4 is a perspective view in which the hydraulic pressure control unit according to the embodiment of the present invention is seen from a base body side of a hydraulic pressure control mechanism.
Figure 5:
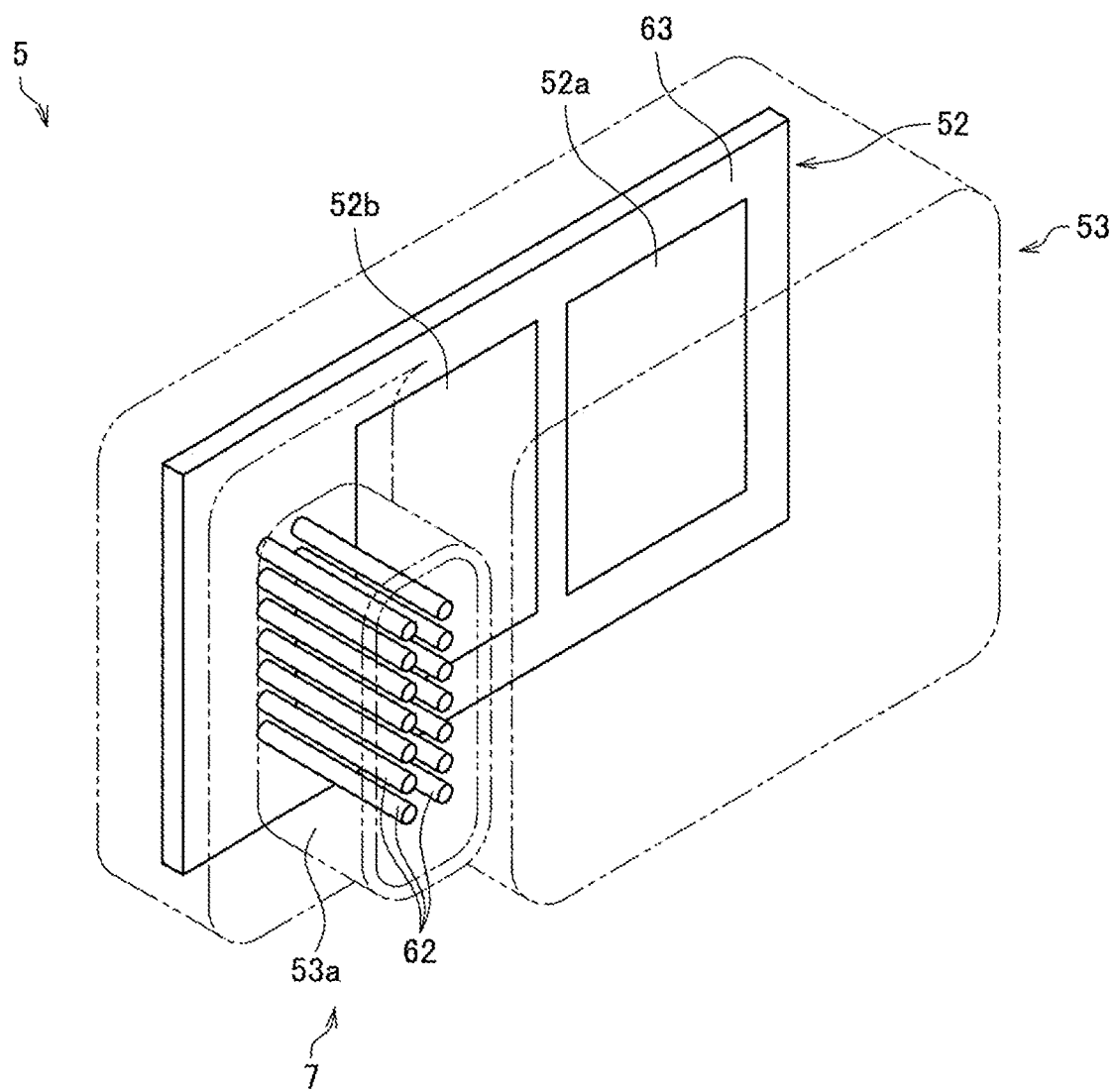
FIG. 5 is a perspective view in which a controller according to the embodiment of the present invention is seen from the base body side of the hydraulic pressure control mechanism.

A description will herein be made on the further detailed configuration of the hydraulic pressure control unit 5 according to the embodiment of the present invention with reference to FIG. 3 to FIG. 5.

FIG. 3 is a perspective view in which the hydraulic pressure control unit 5 according to the embodiment of the present invention is seen from a case 53 side. FIG. 4 is a perspective view in which the hydraulic pressure control unit 5 according to the embodiment of the present invention is seen from a base body 51a side of a hydraulic pressure control mechanism 51. FIG. 5 is a perspective view in which the controller 52 according to the embodiment of the present invention is seen from the base body 51a side of the hydraulic pressure control mechanism 51.

As illustrated in FIG. 3 to FIG. 5, the hydraulic pressure control unit 5 includes: the hydraulic pressure control mechanism 51 that includes the base body 51a and components assembled in the base body 51a to control the brake hydraulic pressure generated in the motorcycle 100; the controller 52 that controls operation of each of the components; and the case 53 that is held by the base body 51a.

The base body 51a has a substantially rectangular-parallelepiped shape and is formed of a metallic material, for example. In the base body 51a of the hydraulic pressure control mechanism 51, the primary channels 25, the secondary channels 26, and the supply channels 27 are specifically formed, and the inlet valves 31, the outlet valves 32, the accumulators 33, the pumps 34, the first valves 35, and the second valves 36 are assembled therein as the components that control the brake hydraulic pressure generated in the motorcycle 100. Multiple ports 61, each of which communicates with the corresponding channel, are formed on an outer surface of the base body 51a. A brake fluid pipe that is connected to the master cylinder 21 or the wheel cylinder 24 is attached to each of the ports 61.

The base body 51a may be formed of one member or may be formed of multiple members. In the case where the base body 51a is formed of multiple members, each of the components may separately be provided in the different member from each other.

The controller (ECU) 52 includes a brake control section 52a that controls the operation of each of the components assembled in the base body 51a. The controller 52 further includes a power control section 52b that controls operation of the power generator (more specifically, the engine 15) for the motorcycle 100.

The brake control section 52a is partially or entirely constructed of a microcomputer, a microprocessor unit, or the like, for example. The brake control section 52a may partially or entirely be constructed of a member in which firmware or the like can be updated, or may partially or entirely be a program module or the like that is executed by a command from a CPU or the like, for example.

More specifically, the brake control section 52a controls the operation of each of the components assembled in the base body 51a, and thus can control the braking force to be applied to the front wheel 3 by the front-wheel brake mechanism 12 and the braking force to be applied to the rear wheel 4 by the rear-wheel brake mechanism 14. For example, the brake control section 52a makes the above components execute the operation such as the ABS operation or the automatic braking operation as described above in accordance with the travel state of the motorcycle 100.

The power control section 52b is partially or entirely constructed of a microcomputer, a microprocessor unit, or the like, for example. The power control section 52b may partially or entirely be constructed of a member in which firmware or the like can be updated, or may partially or entirely be a program module or the like that is executed by a command from a CPU or the like, for example.

More specifically, the power control section 52b controls operation of each device in the engine 15, so as to control the throttle opening amount, ignition timing, a fuel injection amount, and the like. In this way, the power output from the engine 15 can be controlled.

The power control section 52b and the brake control section 52a described above are communicable with each other and execute each type of the control on the basis of information acquired by the communication.

From a perspective of further appropriately executing each of the types of the control including the control of the power and the control of the braking force, the power control section 52b and the brake control section 52a preferably execute each of the types of the control in cooperation with each other. For example, there is a case where, when the brake control section 52a makes the components, which are assembled in the base body 51a, execute the automatic braking operation to stabilize the posture of the above-described motorcycle 100, the power control section 52b controls the power output from the engine 15 without relying on an accelerator operation by the driver in order to stabilize the posture of the motorcycle 100. In such a case, the power control section 52b preferably controls the power on the basis of an influence of the control of the braking force by the brake control section 52a on the posture of the motorcycle 100. Meanwhile, the brake control section 52a preferably controls the braking force on the basis of an influence of the control of the power by the power control section 52b on the posture of the motorcycle 100. Such cooperative control can be executed by sharing one microcomputer between the power control section 52b and the brake control section 52a.

From a perspective of increasing a speed of the communication between the control sections, the power control section 52b and the brake control section 52a preferably communicate with each other by serial communication. For example, the serial communication is further preferably SPI communication.

From a perspective of effectively saving a space where devices can be mounted in the motorcycle 100, for example, as illustrated in FIG. 3 to FIG. 5, the power control section 52b and the brake control section 52a are preferably mounted on the same board 63. However, the power control section 52b and the brake control section 52a may be mounted on different boards from each other. In such a case, the boards are communicably connected by a flexible cable or the like, for example.

In a state of accommodating the brake control section 52a, the case 53 is held by the base body 51a. Furthermore, the power control section 52b is accommodated with the brake control section 52a in the case 53.

For example, the case 53 has a substantially rectangular parallelepiped shape that is hollow and has an opening on one end side, and is formed of a resin. In a state where the opening of the case 53 is closed by the base body 51a, the case 53 is held by the base body 51a. For example, the case 53 may directly be held by the base body 51a or may indirectly be held by the base body 51a via another member. In the case 53, the board 63 of the controller 52 is accommodated. As described above, the power control section 52b and the brake control section 52a are mounted on the board 63. Thus, the power control section 52b and the brake control section 52a are in a state of being accommodated together in the case 53.

Here, from a perspective of appropriately dissipating heat from the controller 52, a heat dissipation property of the power control section 52b is preferably higher than a heat dissipation property of the brake control section 52a in the case 53. For example, in the case where a heat dissipation fin is formed near the power control section 52b in the case 53, the heat dissipation property of the power control section 52b can be increased to be higher than the heat dissipation property of the brake control section 52a.

As illustrated in FIG. 4 and FIG. 5, the hydraulic pressure control unit 5 further includes a connector section 7 to which a cable is attached, and the cable is connected to multiple external devices as devices on the outside of the hydraulic pressure control unit 5. The connector section 7 includes multiple pins 62 that are connected to the multiple external devices via the cable.

For example, the connector section 7 is provided on an outer surface of the case 53, and includes a cylindrical section 53a that is formed in a manner to extend to the outside of the case 53. The multiple pins 62 are located in the cylindrical section 53a and extend along an extending direction of the cylindrical section 53a. One end of each of the multiple pins 62 is connected to the board 63 of the controller 52, and the power control section 52b and the brake control section 52a are communicable with the external device corresponding to each of the pins 62 via the corresponding pin 62. In this way, the power control section 52b and the brake control section 52a can use various types of information acquired by the communication with the external devices for each control.

From the perspective of effectively saving the space where the devices can be mounted in the motorcycle 100, at least one pin 62 of the multiple pins 62 is preferably shared between the power control section 52b and the brake control section 52a.

For example, the at least one of the pins 62 shared between the power control section 52b and the brake control section 52a includes at least one of the pin connected to a power supply, the pin receiving a signal from an ignition switch, the pin receiving a signal from a brake light switch, the pin connected to the ground, the pin transferring data of CAN communication, and the pin receiving a detection signal of a sensor.

More specifically, the signal from the ignition switch described above is a signal indicative of a switching state of the ignition switch of an accessory, an ignition-ON, or the like. In addition, more specifically, the signal from the brake light switch described above is a signal indicative of whether the driver grasps the brake lever. Furthermore, the sensor described above includes a sensor that detects a rotational frequency of the wheel, an inertial measurement unit (IMU), or the like, for example. The inertial measurement unit includes a three-axis gyroscope sensor and a three-directional acceleration sensor, and is a sensor that detects an angular velocity and angular acceleration of each of a roll angle, a pitch angle, and yaw angle.

<Effects of Hydraulic Pressure Control Unit>

A description will be made on effects of the hydraulic pressure control unit 5 according to the embodiment of the present invention.

In the hydraulic pressure control unit 5, the controller 52 includes the brake control section 52a that controls the operation of each of the components for controlling the brake hydraulic pressure generated in the motorcycle 100 as the straddle-type vehicle, and the brake control section 52a is accommodated in the case 53 that is held by the base body 51a. The controller 52 further includes the power control section 52b that controls the operation of the engine 15 as the power generator for the motorcycle 100, and the power control section 52b is accommodated together with the brake control section 52a in the case 53. In this way, it is possible to prevent a controller that controls the operation of each of the above components and a controller that controls the operation of the engine 15 from being separately mounted on the motorcycle 100. Thus, the space used to mount the controllers on the motorcycle 100 can be reduced. Therefore, the space where the devices can be mounted in the motorcycle 100 can be saved.

Furthermore, as described above, in the hydraulic pressure control unit 5, it is possible to prevent the controller that controls the operation of each of the above components and the controller that controls the operation of the engine 15 from being separately mounted on the motorcycle 100. Thus, the number of the cables connecting the devices in the motorcycle 100 can be reduced.

In the hydraulic pressure control unit 5, the power control section 52b and the brake control section 52a preferably execute each of the types of the control in cooperation with each other. Accordingly, the power control section 52b can control the power on the basis of the influence of the control of the braking force by the brake control section 52a on the motorcycle 100. Meanwhile, the brake control section 52a can control the braking force on the basis of the influence of the control of the power by the power control section 52b on the motorcycle 100. Therefore, it is possible to appropriately execute each of the types of the control including the control of the power and the control of the braking force.

In the hydraulic pressure control unit 5, the power control section 52b and the brake control section 52a are preferably mounted on the same board 63. Here, in the case where the power control section 52b and the brake control section 52a are mounted on the different boards from each other, the control sections have to communicate with each other via a cable that connects the boards. Meanwhile, in the case where the power control section 52b and the brake control section 52a are mounted on the same board 63, the control sections can communicate with each other without the cable being interposed therebetween. As a result, the space where the devices can be mounted in the motorcycle 100 can further effectively be saved. Furthermore, noise generated by the communication between the control sections can be reduced.

In the hydraulic pressure control unit 5, the power control section 52b and the brake control section 52a preferably communicate with each other by the serial communication. Here, in the case where one controller including the brake control section 52a and another controller including the power control section 52b are separately mounted on the motorcycle 100, the power control section 52b and the brake control section 52a have to communicate with each other by the CAN communication. Meanwhile, in the case where the power control section 52b and the brake control section 52a are provided in the controller 52 of the hydraulic pressure control unit 5 and are both accommodated in the case 53 of the hydraulic pressure control unit 5, a communication path between the power control section 52b and the brake control section 52a can be reduced. Thus, it is possible to suppress the generation of the noise in the communication between the control sections. Accordingly, the power control section 52b and the brake control section 52a can communicate with each other by the serial communication. Therefore, the speed of the communication between the control sections can be increased.

In the hydraulic pressure control unit 5, the serial communication described above is preferably the SPI communication. In this way, the speed of the communication between the control sections can further effectively be increased.

In the hydraulic pressure control unit 5, the heat dissipation property of the power control section 52b is preferably higher than the heat dissipation property of the brake control section 52a in the case 53. Here, during driving of the motorcycle 100, a calculation frequency of the power control section 52b tends to be higher than a calculation frequency of the brake control section 52a. As a result, a heat generation amount in the power control section 52b tends to be larger than a heat generation amount in the brake control section 52a. Accordingly, in the case where the heat dissipation property of the power control section 52b is increased to be higher than the heat dissipation property of the brake control section 52a in the case 53, it is possible to prevent the power control section 52b and a peripheral portion thereof in the controller 52 from reaching an excessively high temperature. Therefore, the heat can appropriately be dissipated from the controller 52.

In the hydraulic pressure control unit 5, the at least one pin 62 of the multiple pins 62 in the connector section 7, to which the cable connected to the multiple external devices is attached, is preferably shared between the power control section 52b and the brake control section 52a. In this way, the total number of the pins 62 provided in the connector section 7 can be reduced. Accordingly, the hydraulic pressure control unit 5 can be downsized by reducing the number of the components of the hydraulic pressure control unit 5. As a result, the space where the devices can be mounted in the motorcycle 100 can further effectively be saved.

In the hydraulic pressure control unit 5, the at least one of the pins 62 shared between the power control section 52b and the brake control section 52a preferably includes at least one of the pin connected to the power supply, the pin receiving the signal from the ignition switch, the pin receiving the signal from the brake light switch, the pin connected to the ground, the pin transferring data of the CAN communication, and the pin receiving the detection signal of the sensor. In this way, the total number of the pins 62 provided in the connector section 7 can appropriately be reduced.

The present invention is not limited to each of the embodiments. For example, all or parts of the embodiments may be combined, or only a part of each of the embodiments may be implemented.

REFERENCE SIGNS LIST

1: Trunk
2: Handlebar
3: Front wheel
3a: Rotor
4: Rear wheel
4a: Rotor
5: Hydraulic pressure control unit
7: Connector section
10: Brake system
11: First brake operation section
12: Front-wheel brake mechanism
13: Second brake operation section
14: Rear-wheel brake mechanism
15: Engine
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
51: Hydraulic pressure control mechanism
51a: Base body
52: Controller
52a: Brake control section
52b: Power control section
53: Case
53a: Cylindrical section
61: Port
62: Pin
63: Board
100: Motorcycle

What is claimed is:

1. A hydraulic pressure control unit (5) of a brake system (10) for a straddle-type vehicle (100), the hydraulic pressure control unit comprising:
a hydraulic pressure control mechanism (51) that includes: a base body (51a); and a component incorporated in the base body (51a) to control a brake hydraulic pressure generated in the straddle-type vehicle (100);
a controller (52) that includes a brake control section (52a) that controls operation of the component; and
a case (53) that is held by the base body (51a) in a state of accommodating the brake control section (52a); and
a connector section (7) to which a cable connected to multiple external devices on the outside of the hydraulic pressure control unit (5) is attached,
wherein the controller (52) includes a power control section (52b) that controls operation of a power generator for the straddle-type vehicle (100), and the power control section (52b) is accommodated together with the brake control section (52a) in the case (53), wherein the power generator is configured such that the straddle-type vehicle (100) travels by using power output from the power generator, wherein the connector section (7) includes multiple pins (62) that are connected to the multiple external devices via the cable, and wherein one pin (62) of the multiple pins (62) is shared between the power control section (52b) and the brake control section (52a).

2. The hydraulic pressure control unit according to claim 1, wherein the power control section (52b) and the brake control section (52a) execute each type of the control in cooperation with each other.

3. The hydraulic pressure control unit according to claim 1, wherein the power control section (52b) and the brake control section (52a) are mounted on a same board (63).

4. The hydraulic pressure control unit according to claim 1, wherein the power control section (52b) and the brake control section (52a) communicate with each other by serial communication.

5. The hydraulic pressure control unit according to claim 4, wherein the serial communication is SPI communication.

6. The hydraulic pressure control unit according to claim 1, wherein in the case (53), a heat dissipation property of the power control section (52b) is higher than a heat dissipation property of the brake control section (52a).

7. The hydraulic pressure control unit according to claim 1, wherein the one pin (62) that is shared between the power control section (52b) and the brake control section (52a) is connected to a power supply.

8. The hydraulic pressure control unit according to claim 1, wherein the one pin (62) that is shared between the power control section (52b) and the brake control section (52a) receives a signal from an ignition switch.

9. The hydraulic pressure control unit according to claim 1, wherein the one pin (62) shared between the power control section (52b) and the brake control section (52a) receives a signal from a brake light switch.

10. The hydraulic pressure control unit according to claim 1, wherein the one pin (62) that is shared between the power control section (52b) and the brake control section (52a) is connected to ground.

11. The hydraulic pressure control unit according to claim 1, wherein the one pin (62) that is shared between the power control section (52b) and the brake control section (52a) transfers data of CAN communication.

12. The hydraulic pressure control unit according to claim 1, wherein the one pin (62) shared between the power control section (52b) and the brake control section (52a) receives a detection signal of a sensor.

* * * * *